Patented Apr. 21, 1953

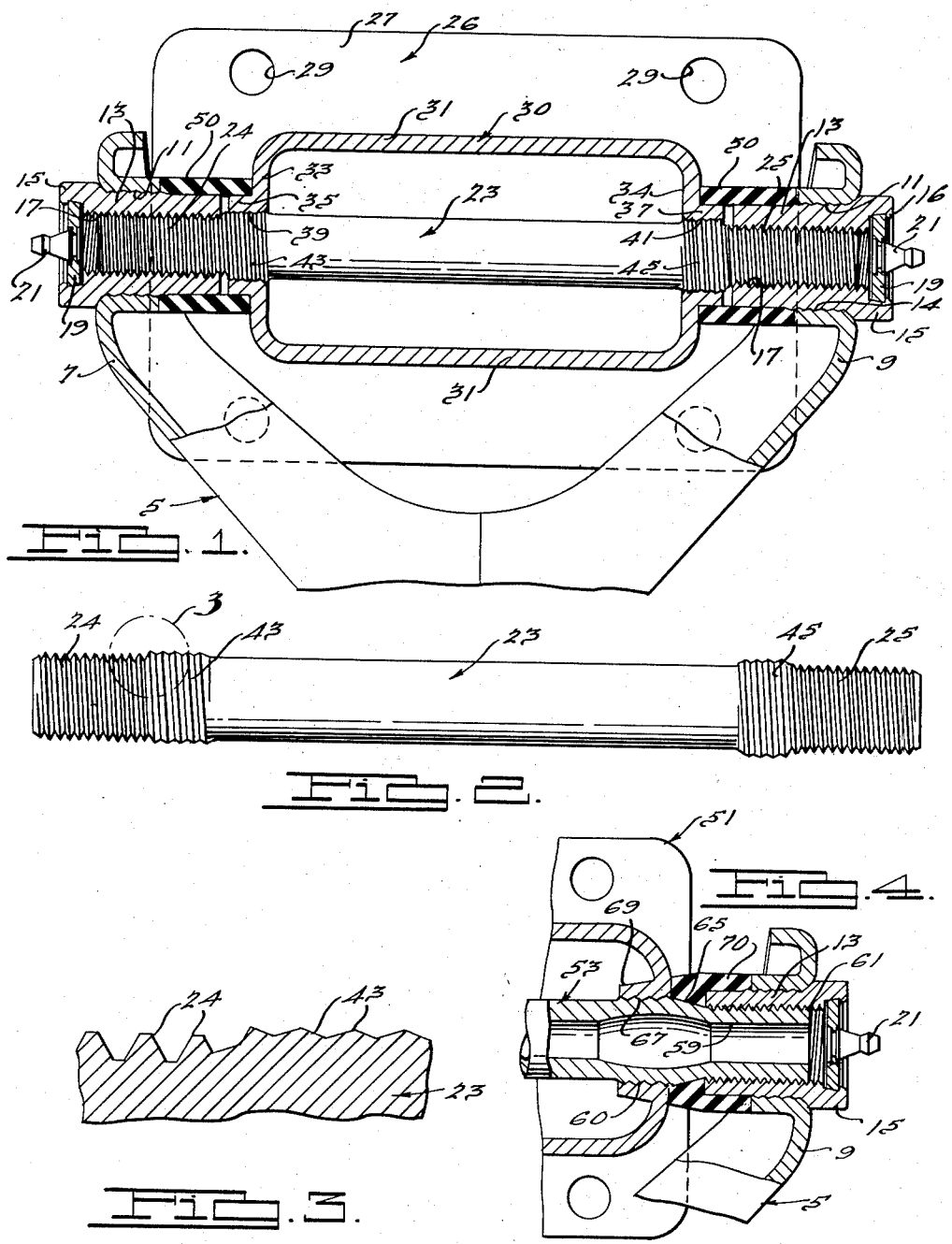

2,635,927

UNITED STATES PATENT OFFICE 2,635,927

PIVOT BAR AND MOUNTING BRACKET

John W. Leighton, Port Huron, Mich.

Application May 29, 1948, Serial No. 30,121

14 Claims. (Cl. 308—2)

This invention relates generally to individual wheel suspensions for automotive vehicles, and more particularly to an improved control arm pivot bar and means for connecting such bar to a frame member of a vehicle.

Generally, in a very popular type of automotive individual wheel suspension, wishbone-type control arms are employed having their inner ends bifurcated and pivotally connected to the vehicle frame by means of a fixedly positioned pivot bar. In previous practice, such pivot bars have commonly been forged or hot upset with lugs or bosses thereon for bolting directly to a vehicle frame member or to a bracket which is connected to the vehicle frame. Such forged or hot upset control bars are relatively expensive to manufacture and to install, and it is an important object of this invention to provide an improved cold treated bar adapted to be made in a rapid and economical manner from a continuous coil of rod or bar stock, and which incorporates novel, improved and simplified means for attaching the bar to a vehicle frame.

It is a further object of this invention to provide an improved control arm pivot bar, preferably cold upset from a continuous coil of rod stock, or which may be formed of straight rod stock without in either case the necessity of a hot forging or upsetting operation. It is also an object to provide such an improved pivot bar incorporating threaded-type pivot bearings at its opposite ends for pivotal connection to the inner bifurcated ends of a control arm, the bar also being provided with novel and improved threaded-type securing means for connecting the bar to a vehicle frame member without the use of separate bolts.

It is a still further object of this invention to provide an improved control arm pivot bar of the aforementioned type which is provided with a lubricant reservoir adapted to retain a quantity of lubricant so as to eliminate the necessity of frequent lubrication of this portion of the individual wheel suspension.

Other objects of the invention will become apparent from the following detailed description taken in conjunction with the accompanying drawing in which:

Figure 1 is a top plan view of the inner end of an upper control arm pivotally connected to the control arm bar and bracket of this invention, with parts broken away in section;

Figure 2 is an elevational view of the control arm bar illustrated in Figure 1;

Figure 3 is an enlarged view of a portion of the control arm bar illustrated in Figure 2 taken within the area of the circle designated 3 in Figure 2; and Figure 4 is a fragmentary view similar to Figure 1 illustrating a further embodiment of the invention.

Referring now to the drawing, and more particularly to Figure 1, it will be seen that a portion of an individual wheel suspension is indicated which includes a generally channel-sectioned sheet metal upper control arm 5, of the wishbone-type, formed with bifurcated inner end portions 7 and 9. The bifurcated upper control arm end portions 7 and 9 have aligned apertures 11 adjacent the inner ends thereof and in each such aperture a hollow bearing bushing 13 is mounted. Each bearing bushing has shallow external threads 14 and a hexagonal or polygonal shaped head 15 on the outer end thereof. The external threads 14 of the bushings 13 commence at a point spaced inwardly from the end thereof and may increase gradually to their full height. Although they are relatively shallow, as indicated, the outside diameter of the threads exceeds the internal diameter of the coacting openings 11 in the arm, so that the bushings form their own threads in the arm as they are screwed thereinto. When tightened into place, each bushing head 15 is seated against the outer face of its control arm end portion 7 or 9 to retain the bushing tightly in the control arm. Each bushing 13 is also provided with an axially extending threaded bore 17, which provides a threaded bearing surface, as will hereinafter appear. The outer end of the threaded bore 17 of each bushing may be closed by means of a closure disk 19 provided with a suitable lubricant fitting 21, by means of which the threaded bearing surfaces may be supplied with lubricant from time to time as may be necessary.

The bushings 13 are journaled on the opposite ends of a bar 23, fixedly carried by the vehicle frame. Bar 23 is preferably cold upset or machined from round bar stock, the extreme opposite ends thereof being threaded at 24 and 25 to threadedly receive the cooperating internally threaded portions 17 of the bushings 13. The internal and external bushing threads 17, 14 are of the same pitch and transversely aligned, so that installation of the bushings may be effected with the arm in place over the ends of the rod, simply by simultaneously threading each bushing into the armhole 11 and over the threaded end of the rod.

In order to connect the bar 23 to a vehicle frame member, a bracket 26 is provided which is preferably of the inexpensive stamped sheet metal variety. The bracket 26 includes a flat base portion 27 having a plurality of spaced apertures 29 therein, through which bolts or other securing means may extend in order to rigidly connect the base portion 27 rigidly to the vehicle frame member, although it will be appreciated that the bracket may be welded to the frame if preferred. The bracket 26 is formed with a central cuplike bar-supporting portion which comprises opposed longitudinally extending side walls 31 and opposed transversely extending end walls 33 and 34. The end walls 33 and 34 are formed with opposed outwardly projecting annular flanges 35 and 37, respectively, which define bracket apertures 39 and 41, respectively, in each end wall. The bracket aperture 39 is smaller in diameter than the bracket aperture 41, while the threaded bearing surfaces 24 and 25, on the opposite ends of the bar 23, are of lesser outside diameter than the smaller aperture 39, for reasons which will hereinafter appear.

Inwardly of and adjacent to the threaded bearing surface 24 the bar is provided with a threaded surface 43 which consists of shallow obtuse angled threads, the general form of which is similar to that of the threads 14. The outside diameter of the threaded surface 43 is larger than the outside diameter of the threaded bearing surfaces 24 and 25 and the bracket aperture 39, but is smaller in diameter than the diameter of the bracket aperture 41.

A threaded surface 45 is also formed on the bar 23 adjacent the threaded bearing surface 25, and the threads thereof are similar to the threads 43 but somewhat larger in diameter, to coact with the larger bracket aperture 41. The threads of the portions 43, 45 are in a predetermined angular relationship or registry with respect to one another, being preferably so positioned that if they were of the same diameter they would be helically colineal, that is, would form parts of the same helix if extended. The threads 43, 45 form their own threads in the respective bracket openings 39, 41. The bar is inserted in the bracket from the right, as the parts are viewed in Figure 1, by inserting the threaded bearing end 24 thereof inwardly through the bracket aperture 41. Threaded portion 43 is small enough to pass entirely through the bracket aperture 41 so that portions 43, 39 engage one another simultaneously with engagement of the corresponding threaded holding portions 45, 41, and the threaded bearing end 24 projects outwardly beyond the left end wall 33 of the bracket. The control arm bar 23 is then connected to the bracket 26 by simultaneously threading the threaded surface 43 into the bracket aperture 39, and the threaded surface 45 into the bracket aperture 41. This may be done by a stud driver applied to end 25 and a pull nut on end 24. The threaded surfaces 43 and 45 will thereby be forced into the walls of the bracket apertures 39 and 41 and will deform and expand the metal so that the bar will be tightly screwed into the bracket and retained against rotative or axial movement in the bracket end walls 33 and 34, while the threaded bearing ends 24 and 25 will project outwardly of their respective bracket end walls 33 and 34. The pull nut insures full and proper inward movement of the bar during this operation, and the fact that the threads 43, 45 are in a relationship of spiral continuity with respect to one another insures a definite relationship between the threads formed by the bar in the bracket openings 49, 41. Thus if it becomes necessary to replace the pivot bar on a vehicle equipped with my improved construction, a new bar provided with similar helically colineal threads may be threaded into the openings 39, 41 in place of a bar removed therefrom, and will accurately fit and be effectively held by the threads formed in the bracket by the bar initially installed.

In forming the bearing threads 24, 25 and the holding threads 43, 45 upon the rod, I preferably employ special chasers, formed to cut the threads 43 simultaneously with the threads 24, and the threads 45 simultaneously with the threads 25.

In assembling the parts, after the rod is positioned in the bracket in the manner indicated, the control arm assembly is positioned upon the rod without the bushings 13. In installing the control arm, its bifurcated ends are placed over the ends of the rod, by first hooking one side of the arm over one end of the rod, moving such side in close to the bracket flange 35 or 37, and then swinging the other side of the arm into hooked or over-engaged relation with the other projecting end of the rod. The bushings 13 can then be threaded on the bearing surfaces 24 and 25 and into the apertures 11 as previously indicated, so as to pivotally connect the arm to the threaded bearing ends of the bar. The threaded portions of the bar are hardened, while the apertured portions of the arm are relatively soft, so that as the bushings are screwed into place, the bearing threads act as positive feeding means, pulling the bushing inwardly at the proper lead or rate so that it forms true threads in the armhole 11, corresponding in pitch to those both on the inside and on the outside of the bushing. It will be appreciated that this facilitates removal and reinsertion of bushings without danger of so mutilating the apertured portions of the arm as to prevent proper holding. A conventional rubber sleeve 50 surrounds the inner end of each bushing 13 and its adjacent bracket end wall annular flange 35 or 37 to prevent leakage of lubricant and guard against entrance of foreign matter.

In the embodiment illustrated in Figure 4, a bracket 51 is provided which is generally similar to the bracket 26 previously described, and which is adapted to be connected to a vehicle frame member as previously described. The control arm end portions, only one of which, designated 9, is illustrated, are pivotally connected to a pivot bar 53 which is generally similar to the bar 23 previously described, through bearing bushings as 13. The primary difference between the bar 23 and the bar 53 is the fact that the bar 53 is tubular, its central, longitudinally extending opening 59 forming an enlarged reservoir for the reception and retention of lubricant or grease for the threaded bearing surfaces on the outer ends of the bar 53 and in the bushings 13. It will be noted that in this embodiment the locking threads 60 are formed on the bar 53 near the outer ends thereof but are spaced inwardly from the bearing threads 61, which are at the extreme ends of the bar, the bearing threads and locking threads being separated by a smooth shoulder 65 of generally conic form. Shoulder 65 forms a seat for the soft rubberlike sealing sleeve 70, taking the place of flange 37 since bracket 51 has its end wall annular flange 69 extending inwardly with respect to the end wall, rather than outwardly as in the previous embodiment. The lubricant reservoir 59 in the control bar 53 greatly augments that between the end of the pivot bar and plug 19, and may be filled with lubricant through the lubricant fitting 21. Lubrication of the bearing surfaces will be required only at long intervals with this modified structure.

Other elements of the modified construction, since they correspond to those of the first embodiment, will require no detailed redescription.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

I claim:

1. A pivot bar including round bearing surfaces adjacent the opposite ends thereof, a threaded surface on said bar disposed inwardly of and adjacent to one of said bearing surfaces, the threads of said threaded surface having a larger outside diameter than the outside diameter of said bearing surfaces, and a threaded surface disposed inwardly of and adjacent to the other of said bearing surfaces, the threads of said latter threaded surface having the outside diameter thereof larger than the outside diameter of the threads of said threaded surface adjacent the other of said bearing surfaces.

2. A pivot bar including round threaded bearing surfaces adjacent the opposite ends thereof, a threaded surface on said bar disposed inwardly of and adjacent to one of said threaded bearing surfaces, the threads of said threaded surface having a larger outside diameter than the outside diameter of the threads of said threaded bearing surfaces, and a threaded surface disposed inwardly of and adjacent to the other of said threaded bearing surfaces, the threads of said latter threaded surface having the outside diameter thereof larger than the outside diameter of the threads of said threaded surface adjacent the other of said threaded bearing surfaces.

3. A pivot bar including threaded bearing surfaces adjacent the opposite ends thereof, a threaded surface on said bar disposed inwardly of and adjacent to one of said threaded bearing surfaces, the threads of said threaded surface being relatively shallow in comparison to the threads of said threaded bearing surfaces and being of a larger outside diameter than the outside diameter of the threads of said threaded bearing surfaces, and a threaded surface disposed inwardly of and adjacent to the other of said threaded bearing surfaces, the threads of said latter threaded surface being relatively shallow in comparison to the threads of said threaded bearing surfaces and having the outside diameter thereof larger than the outside diameter of the threads of said threaded surface adjacent the other of said threaded bearing surfaces.

4. A pivot bar including threaded bearing surfaces adjacent the opposite ends thereof, a threaded surface on said bar disposed inwardly of and adjacent to one of said threaded bearing surfaces, the threads of said threaded surface being relatively shallow in comparison to the threads of said threaded bearing surfaces and being disposed in a relatively wide obtuse angular arrangement, the threads of said threaded surface being of a larger outside diameter than the outside diameter of the threads of said threaded bearing surfaces, and a threaded surface disposed inwardly of and adjacent to the other of said threaded bearing surfaces, the threads of said latter threaded surfaces being relatively shallow in comparison to the threads of said threaded bearing surfaces and being disposed in a relatively wide obtuse angular arrangement, the threads of said latter threaded surface being of a larger outside diameter than the outside diameter of the threads of said threaded surface adjacent the other of said bearing surfaces.

5. In combination, a bracket including spaced opposed portions having aligned apertures therethrough, one of said apertures being of a larger diameter than the other, a pivot bar including round bearing surfaces adjacent the opposite ends thereof having an outside diameter less than the diameter of both of said bracket apertures, a first threaded surface on said pivot bar disposed inwardly of and adjacent to one of said bearing surfaces and having a larger outside diameter than said bearing surfaces, the outside diameter of said threaded surface being less than the diameter of the larger of said bracket apertures and greater than the diameter of the smaller of said bracket apertures, said one bearing surface of said bar being inserted inwardly through the larger of said bracket apertures and outwardly through the smaller of said bracket apertures so that said bearing surface projects outwardly of said smaller aperture, and a second threaded surface disposed inwardly of and adjacent to the other of said bearing surfaces, the outside diameter of said second threaded surface being larger than the outside diameter of said first threaded surface, the outside diameter of the threads of said second threaded surface being greater than the diameter of the larger of said bracket apertures, said bar being threadably connected to said bracket apertures by simultaneously threading said first threaded surface into said smaller bracket aperture and said second threaded surface into said larger bracket aperture so as to deform the bracket portions defining said apertures and thereby normally retain said bar in said bracket against rotative and axial movement with the opposed bearing surfaces thereof projecting outwardly beyond each of said bracket portions.

6. In combination, a bracket including opposed spaced portions having aligned apertures therethrough, one of said apertures being of a larger diameter than the other, a pivot bar including threaded bearing surfaces adjacent the opposite ends thereof having an outside diameter less than the diameter of both of said bracket apertures, a first threaded surface on said bar disposed inwardly of and adjacent to one of said bearing surfaces and having a larger outside diameter than said bearing surfaces, the outside diameter of said first threaded surface being less than the diameter of the larger of said bracket apertures and larger than the diameter of the smaller of said bracket apertures, said one bearing surface of said bar being inserted inwardly through the larger of said apertures and outwardly through the smaller of said bracket apertures so that said one bearing surface projects outwardly of said smaller bracket aperture, and a second threaded surface disposed inwardly of and adjacent to the other of said bearing surfaces, the outside diameter of said second threaded surface being larger than the outside diameter of said first threaded surface, the outside diameter of the threads of said second threaded surface being greater than the outside diameter of the larger of said bracket apertures, said pivot bar being threadably connected to said bracket by simultaneously threading said first threaded surface into said smaller bracket aperture and said second threaded surface into said larger bracket aperture so as to deform the bracket portions defining said bracket apertures and thereby normally retain said bar in said bracket against rotative and axial movement with the opposed threaded bearing surfaces thereof projecting outwardly beyond each of said bracket portions.

7. In combination, a stamped sheet metal bracket including opposed spaced portions having opposed and aligned apertures therethrough, one of said apertures being of a larger diameter than the other, a pivot bar including threaded bearing surfaces adjacent the opposite ends thereof having an outside diameter less than the outside diameter of both of said bracket apertures, a first threaded surface on said bar disposed inwardly of and adjacent to one of said bearing surfaces, the threads of said first threaded surface being relatively shallow in comparison to the threads of said threaded bearing surfaces and being disposed in a relatively wide obtuse angular arrangement, the threads of said first threaded surface being of a larger outside diameter than said bearing surfaces and being less than the diameter of the larger of said bracket apertures and smaller than the diameter of the smaller of said bracket apertures, said one threaded bearing surface of said bar being inserted inwardly through the larger of said bracket apertures and outwardly through the smaller of said bracket apertures so as to project beyond the bracket portion in which the smaller of said bracket apertures is located, and a second threaded surface disposed inwardly of and adjacent to the other of said bearing surfaces, the threads of said second threaded surfaces being relatively shallow in comparison to the threads of said threaded bearing surface and being disposed in a relatively wide obtuse angular relationship, the outside diameter of said second threaded surface being larger than the outside diameter of said first threaded surface, the outside diameter of the threads of said second threaded surface being greater than the outside diameter of the larger of said bracket apertures, said bar being threadably connected to said bracket by simultaneously threading the first threaded surface into said smaller bracket aperture and the second threaded surface into the larger of said bracket apertures so as to deform the metal of the bracket portions defining said apertures and thereby normally retaining said bar in said bracket against rotative and axial movement with the opposed bearing surfaces projecting outwardly beyond each of said bracket portions.

8. In combination, a bracket including spaced opposed portions having aligned apertures therethrough, one of said apertures being of a larger diameter than the other, a pivot bar including bearing surfaces adjacent the opposite ends thereof having an outside diameter less than the diameter of both of said bracket apertures, a first threaded surface on said pivot bar disposed inwardly of and adjacent to one of said bearing surfaces and having a larger outside diameter than said bearing surfaces, the outside diameter of said threaded surface being less than the diameter of the larger of said bracket apertures and greater than the diameter of the smaller of said bracket apertures, said one bearing surface of said bar being inserted inwardly through the larger of said bracket apertures and outwardly through the smaller of said bracket apertures so that said bearing surface projects outwardly of said smaller aperture, and a second threaded surface disposed inwardly of and adjacent to the other of said bearing surfaces, the outside diameter of said second threaded surface being larger than the outside diameter of said first threaded surface, the outside diameter of the threads of said second threaded surface being greater than the diameter of the larger of said bracket apertures, said bar being threadably connected to said bracket apertures by simultaneously threading said first threaded surface into said smaller bracket aperture and said second threaded surface into said larger bracket aperture so as to deform the bracket portions defining said apertures and thereby normally retain said bar in said bracket against rotative and axial movement with the opposed bearing surfaces thereof projecting outwardly beyond each of said bracket portions, said pivot bar having an opening extending axially entirely therethrough adapted for use as a lubricant reservoir.

9. A stamped sheet metal member including a base portion and an upwardly projecting inverted cuplike portion having opposed walls, opposed annular flanges projecting from said walls and defining aligned apertures in said walls, one of said apertures being of a larger diameter than the other.

10. A pivot bar having two spaced holding thread courses of different diameters, the maximum peak diameter of the threads of one of said courses being less than the root diameter of the threads of the other of said courses, a stem portion between and connecting said courses and of a diameter which does not exceed the root diameter of the larger of said courses, and a round bearing portion located on the opposite side of one of said courses from the connecting portion and substantially concentric with said holding thread courses and smaller in diameter than the root diameter of the smaller of said holding thread courses.

11. A pivot bar having a pair of spaced holding thread courses of different diameters, said thread courses being of the same lead, the maximum peak diameter of the threads of one of said courses being less than the root diameter of the threads of the other of said courses, and bearing thread portions of lesser diameter than the holding thread courses and coaxial therewith.

12. A pivot bar having a plurality of spaced holding thread courses of different diameters, the maximum peak diameter of the threads of one of said courses being less than the root diameter of the threads of the other of said courses, and bearing thread portions of lesser diameter than the holding thread courses and coaxial therewith, all of said thread courses and thread portions being of the same lead and in predetermined angular relationship to one another.

13. A pivot bar having a plurality of spaced holding thread courses of different diameters, the maximum peak diameter of the threads of one of said courses being less than the root diameter of the threads of the other of said courses, and bearing thread portions of lesser diameter than the holding thread courses and coaxial therewith, all of said thread courses and thread portions being of the same lead and substantially helically colineal with respect to one another.

14. A pivot bar having two spaced holding thread courses of different diameters, the maximum peak diameter of the threads of one of said courses being less than the root diameter of the threads of the other of said courses, a stem portion between and connecting said courses and of a diameter which does not exceed the root diameter of the larger of said courses, and a round bearing portion located on the opposite side of one of said courses from the connecting portion and substantially concentric with said holding thread courses.

JOHN W. LEIGHTON.

References Cited in the file of this patent
UNITED STATES PATENTS

| Number | Name | Date |
|---|---|---|
| 459,954 | Barrows | Sept. 22, 1891 |
| 1,041,440 | Decker | Oct. 15, 1912 |
| 1,050,097 | Boero | Jan. 14, 1913 |
| 2,200,227 | Olson | May 7, 1940 |
| 2,305,174 | Leighton | Dec. 15, 1942 |